Patented Dec. 28, 1948

2,457,225

UNITED STATES PATENT OFFICE 2,457,225

PREPARATION OF ACRYLATES

William F. Gresham, Wilmington, Del., assignor to E. I. du Pont de Nemours & Company, Wilmington, Del., a corporation of Delaware No Drawing. Application May 1, 1946, Serial No. 666,516

8 Claims. (Cl. 260—486)

This invention relates to a process for the preparation of esters of acrylic acid and more particularly to their preparation by the dealcoholization of alkoxy-substituted carboxylic acid esters.

A number of processes have been proposed for the preparation of acrylic acid as, for example, the action of zinc and sulfuric acid on dibrompropionic acid (C., 1900 II, 173); the oxidation of acrolein, U. S. Patent 1,911,219; and the dehydration of beta-hydroxynitriles, U. S. Patent 1,829,208. The present day commercial use of acrylic acid is principally as an intermediate in the preparation of the esters of the acid. The esters have likewise been made by the treatment of beta-halogen propionic acid esters with a base (Bauer U. S. Patent 1,864,884), this inventor stating that due to the sensitivity of the ester group it had previously been impossible to produce the esters directly and by the treatment of hydracrylic acid esters with a dehydrating agent at temperatures above 280° C. (Bauer U. S. 1,890,277). The reactants and procedural details of these processes have been costly and as a consequence the resulting product whether in the monomeric or polymeric form has been expensive and its use accordingly curtailed.

An object of the present invention is to provide an inexpensive process for the preparation of unsaturated carboxylic acid esters. Another object is to provide a process for the dealcoholysis of alkoxy-substituted carboxylic acid esters. Yet another object is to provide general and preferred conditions and catalysts for the dealcoholysis of alkoxy-substituted carboxylic acid esters. A further object is to provide a process for the preparation of the lower esters of acrylic acid by the dealcoholysis of alkoxy-substituted propionic acid esters. Other objects and advantages of the invention will hereinafter appear.

The above and other objects are realized by a process wherein alcohol is split from alkoxy-substituted carboxylic acid esters without effecting the ester group, the removal of the alcohol resulting in the formation of an ester having an unsaturated carbon to carbon bond within the acid portion of the molecule.

Generically the reaction may be illustrated by the equation:

(1)

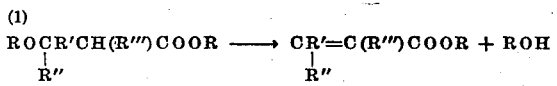

wherein R is an alkyl group such as methyl, ethyl, N— and isopropyl, N— an isobutyl or higher alkyl group, an aryl group such as phenyl, tolyl, a substituted-alkyl or aryl group such as carbomethoxyethyl, R' or R" is hydrogen or is a group from the substituents groups described for R, and R''' is hydrogen or an alkyl group. As is apparent from the equation the reaction, which is herein called a dealcoholysis, results in splitting the alkoxy group from the saturated ester with the removal of hydrogen from the alpha carbon atom to the carboxy group, resulting in the formation of an unsaturated carbon-carbon bond between the alpha and beta carbons.

A specific embodiment of the invention is illustrated by equation (2).

(2)

wherein the ethyl ester of beta-ethoxy propionic acid is dealcoholized to ethyl acrylate. Similarly the invention embodies in its simpler aspects the dealcoholysis, inter alia, of the methyl ester of beta-methoxypropionic acid to the valuable ester, methyl acrylate. The methacrylates are prepared by the process illustrated by this equation:

(3)

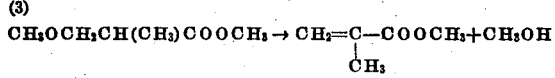

wherein alpha methyl beta methoxy propionic acid methyl ester is dealcoholized to methyl alpha methacrylate.

Inasmuch as the class of esters, which are dealcoholized in accord with the process of this case, is not well known, applicant herewith describes their preparation although a more complete description thereof will be found in the R. E. Brooks copending application S. N. 627,779, filed November 9, 1945, now Patent No. 2,436,286 dated February 17, 1948. These alkoxy-substituted esters are prepared by reacting an acetal, including the formals, with ketene or an alkyl substituted ketene. For the preparation of the propionic acid-substituted esters the formals are employed such, for example, as methylal, diethyl formal, dipropyl formal, or the higher molecular weight formals as well as the unsymmetrical formals such as methyl ethyl formal, methyl propyl formal and the like. For the preparation of higher substituted carboxylic acid esters, such acetals as dimethyl acetal, diethyl acetal, methyl ethyl acetal and like derivatives of the propanals, etc. are used.

The reaction is conducted by mixing a catalyst with the acetal, such, for example, as sulfuric acid, phosphoric acid, boron fluoride or other acid catalyst and thereafter introducing the ketene into the resulting mixture. The reaction takes place spontaneously and the temperature is preferably held below 100° C. After the reaction the catalyst is neutralized with an alkali metal alkoxide or other common base until slightly basic and the alkoxy-substituted carboxylic acid ester recovered by distillation.

The intermediate to be dealcoholized to the methacrylic acid ester may be formed in accord with the aforesaid Brooks process from methylal and methyl ketene or by the condensation reaction of methanol with methacrolein which is carried out at a temperature of about −15° C. with an alkali metal alkoxide catalyst, this reaction is more fully described in the copending application.

Dealcoholysis reactions, and especially those in which an ester is dealcoholized without degrading the ester group are comparatively new. When such reactions have been conducted they have usually been done in the presence of acidic catalysts (cf. Ger. 573,724). In certain cases of unstable alkoxy compounds, uncatalyzed pyrolysis has led to dealcoholysis (cf. Hurd, "Pyrolysis of Carbon Compounds," 1929, pp. 228–230). According to the present invention, the dealcoholysis of alkoxy-substituted carboxylic acid esters is conducted preferably by passing the ester in the vapor phase over a basic catalyst. The conversion of saturated ester to unsaturated ester by the process is substantially quantitative there being produced by the reaction a mixture of alcohol and unsaturated ester containing a small amount of the unconverted saturated ester which may be separated and returned to the process.

The reaction is preferably conducted in the vapor phase and at a temperature above the boiling point of the ester being treated. Inasmuch as the esters are comparatively stable thermally, the reaction may take place at temperatures well above the boiling point; generally, it has been found that the reaction proceeds smoothly at temperatures between 350 and 450° C. although excellent results are realized by operation between 300 and 550° C.

The saturated alkoxy-substituted esters are dealcoholized in the vapor phase reaction by contact with a basic catalyst, such, for example, as an oxide, hydroxide, carbonate, borate, or other basic salt of a metal and more especially of an alkali metal or an alkaline earth metal which may or may not be supported on a suitable support such as silica gel, alumina gel, kieselguhr, infusorial earth, or the like. These basic dealcoholysis catalysts are prepared by the general method described in Example 2.

The rate at which the substituted ester is passed over the dealcoholysis catalyst does not appear to be particularly critical for space velocities may range between 100 and 10,000, and more particularly between 500 and 2500, the space velocity being the volume of ester vapors under STP conditions flowing per hour over a unit apparent volume of catalyst. Best results are realized when an ester containing little or no impurities is used although certain amounts of contaminants may be tolerated.

One of the unique characteristics of the process of the instant case is its surprising ability to effect the dealcoholysis of an alkoxy-substituted carboxylic acid ester without degradation of the unsaturated ester formed. It is remarkable that the reaction proceeds with substantially no decomposition of the unsaturated esters produced for it is well known that these esters are not only subject to decomposition at high temperatures but also subject to polymerization under such temperatures.

The examples illustrate preferred embodiments of the invention.

*Example 1.*—Methyl beta-methoxypropionate, boiling point 144° C. at 760 mm., was vaporized and passed over 8–14 mesh acid-washed, ignited crushed quartz at 500° C. Eighty-six per cent of the starting material was recovered by distillation.

In a similar run at 600° C. the conversion to material boiling in the range of the methanol-methyl acrylate azeotrope was ca. 3%. This shows that methyl beta-methoxypropionate is thermally quite stable.

*Example 2.*—Methyl beta-methoxypropionate was processed over silica gel impregnated with sodium borate at a temperature of 400° C. and a space velocity of about 2000 hr.$^{-1}$ The methyl beta methoxypropionate was vaporized in a quartz-packed vaporizer zone and then passed into a tubular reaction zone which had been charged with the dealcoholization catalyst. The catalyst was prepared by impregnating crushed acid-washed extruded silica gel with a 10% aqueous solution of borax, decanting, and drying at 110° C. The reaction vapors issuing from the tubular converter were condensed and the products separated by distillation whereupon it was found that conversion of the methyl beta-methoxypropionate to methyl acrylate was 68.5% with an 83.5% yield and conversion to methanol 75% at a 94% yield, (the yield is defined as the percentage of the theoretical product obtained, based on the amount of reactant consumed—i. e., not recovered). The condensate from the conversion gives a methyl acrylate-methanol azeotrope (53%:47% weight ratio) which may be readily separated by extractive distillation with water, i. e. by introducing water at the top and the azeotrope near the middle of a fractionating column. From the extractive distillation methyl acrylate distills as a heterogeneous azeotrope with water and may be purified by redistillation.

*Example 3.*—When methyl beta-methoxypropionate was vaporized and passed over 8–14 mesh calcium oxide at 500° C. at a space velocity of 1580 hr.$^{-1}$, methyl acrylate was obtained in 29% conversion and 65% yield.

*Example 4.*—Ethyl beta-ethoxypropionate was processed in the vapor phase over a silica gel catalyst impregnated with potassium carbonate, the reaction being conducted at 390° C. and at a space velocity of 740. This catalyst was prepared in a manner similar to the method described in Example 1. Distillation of the product gave ethyl acrylate in a 58% conversion and an 80% yield. In this instance the condensate from the reaction upon distillation gave an ethanol azeotrope with ethyl acrylate in addition to some pure ethyl acrylate.

*Example 5.*—Methyl beta, gamma-dimethoxybutyrate, $CH_3OCH_2CH(OCH_3)CH_2COOCH_3$ was processed over potassium carbonate on silica gel catalyst which was prepared in accord with the general method described above. The reaction was conducted at a temperature of about 400° C. and a space velocity of 1000. The product was recovered by distillation. Pure methyl gamma-methoxy crotonate, $CH_3OCH_2CH:CHCOOCH_3$ was obtained in a conversion of 37.5% and a yield of 73%. In a similar reaction and with an average space velocity of 737 the conversion was 61%.

*Example 6.*—Methyl gamma-methoxycrotonate (boiling point 73° C. at 8 mm.) was obtained in 25% conversion and 75% yield when methyl beta, gamma-dimethoxybutyrate was processed over an impregnated barium hydroxide on silica gel catalyst at a space velocity of 1200 at 400° C.

Potassium hydroxide on silica gel catalyst gave similar results.

Methyl gamma-methoxycrotonate is a colorless liquid boiling at 54–57.5°/8 mm. with a refractive index at 25° of 1.4333, as prepared using a KOH— or $K_2CO_3$— containing catalyst. The product prepared over a $Ba(OH)_2$-containing catalyst is apparently a stereoisomer of the above-mentioned product, for it boils at 56–62°/8.5 mm. and has a refractive index at 25° of 1.4353 to 1.4360. Both products had the correct saponification number. Methyl gamma-methoxycrotonate is a sweet-smelling liquid soluble in methanol, acetone, and benzene, and insoluble in water.

I claim:

1. A process which comprises dealcoholizing a beta-alkoxy-substituted monocarboxylic acid ester to an unsaturated carboxylic acid ester by passing the beta-alkoxy-substituted monocarboxylic acid ester in the vapor phase over a solid inorganic base as the catalyst at a temperature between 300 and 550° C.

2. A process for the preparation of an ester of acrylic acid which comprises splitting an alcohol from a beta-alkoxy-substituted propionic acid ester by passing the ester in the vapor phase over a solid inorganic base as the catalyst at a temperature between 350 and 450° C.

3. A process for the preparation of an alpha alkyl acrylic acid ester which comprises splitting an alcohol from an alpha alkyl beta-alkoxy-substituted propionic acid ester by passing the ester in the vapor phase over a solid inorganic base as the catalyst at a temperature between 300 and 550° C.

4. A process for the preparation of an ester of acrylic acid which comprises splitting an alcohol from a beta-alkoxy-substituted propionic acid ester by heating the ester in the presence of a solid inorganic base as the catalyst at a temperature between 300 and 550° C.

5. A process for the preparation of an ester of alpha methacrylic acid which comprises splitting an alcohol from an alpha methyl beta alkoxy propionic acid ester by heating the ester in the presence of a solid inorganic base as the catalyst at a temperature between 300 and 550° C.

6. A process for the preparation of an ester of acrylic acid which comprises splitting in the vapor phase an alcohol from a beta-alkoxy-substituted propionic acid ester by heating the substituted ester in the vapor phase in contact with an inorganic base supported on silica gel at a temperature between 300 and 550° C.

7. A process for the preparation of methyl gamma-methoxycrotonate which comprises passing the vapors of methyl, beta-gamma-dimethoxy butyrate at a temperature of about 400° C. over a silica gel catalyst impregnated with barium hydroxide.

8. In a continuous process for the preparation of an ester of acrylic acid the step which comprises dealcoholizing an ester of a beta alkoxy propionic acid by passing the vapors of the alkoxy-substituted propionic acid ester over a solid inorganic base as the catalyst, at a temperature between 300 and 550° C. separating the ester of acrylic acid from the unreacted ester of the alkoxy-substituted propionic acid and recycling the latter to the dealcoholysis reaction.

WILLIAM F. GRESHAM.

REFERENCES CITED

The following references are of record in the file of this patent:

UNITED STATES PATENTS

| Number | Name | Date |
|---|---|---|
| 1,890,277 | Bauer | Dec. 6, 1932 |
| 2,341,663 | Schulz | Feb. 15, 1944 |
| 2,376,704 | Kung | May 22, 1945 |
| 2,390,028 | Neher et al. | Nov. 27, 1945 |
| 2,393,737 | Bortnick | Jan. 29, 1946 |

FOREIGN PATENTS

| Number | Country | Date |
|---|---|---|
| 313,877 | Great Britain | Sept. 8, 1930 |
| 361,153 | Great Britain | Nov. 19, 1931 |

OTHER REFERENCES

Peckmann, Berichte, vol. 28, page 1627.

Cope et al., Chemical Abstracts, vol. 27, (1933), page 63.

Arndt et al., Chemical Abstracts, vol. 36, (1942), page 5776.